United States Patent [19]

Meyers

[11] Patent Number: 4,810,833
[45] Date of Patent: Mar. 7, 1989

[54] COVER PLATE FOR ELECTRICAL RECEPTACLES

[76] Inventor: Joel Meyers, 11 Wynn Road, Willowdale, Ontario, Canada, M2R 1S5

[21] Appl. No.: 182,720

[22] Filed: Apr. 18, 1988

[51] Int. Cl.$^4$ ............................................. H05K 5/03
[52] U.S. Cl. ..................................... 174/67; 439/136
[58] Field of Search ............... 174/65, 57; 220/242; 439/136

[56] References Cited

U.S. PATENT DOCUMENTS

| | | | |
|---|---|---|---|
| 3,572,344 | 4/1971 | Snyder | 174/57 |
| 4,352,493 | 8/1982 | Grenell | 439/142 |
| 4,531,794 | 7/1985 | Heverly | 439/147 |
| 4,531,800 | 7/1985 | Avener | 439/373 |
| 4,586,765 | 5/1986 | Ban | 439/142 |
| 4,607,136 | 8/1986 | Thomas | 439/136 X |

Primary Examiner—A. T. Grimley
Assistant Examiner—David A. Tone
Attorney, Agent, or Firm—Ridout & Maybee

[57] ABSTRACT

A cover for an electrical outlet is provided to prevent electric shock to children resulting from insertion of objects into an electrical receptacle. The cover has a base plate having rails extending from its top surface, and a peripheral wall extending from its bottom surface defining a flange. A cover plate has longitudinal slots which coact with the flanges of the base plate to allow the cover plate to slide relative to the base plate. Stop means on the cover and base plates limit the travel of the cover plate, and resilient locking means engage the cover plate when in the covered position.

17 Claims, 3 Drawing Sheets

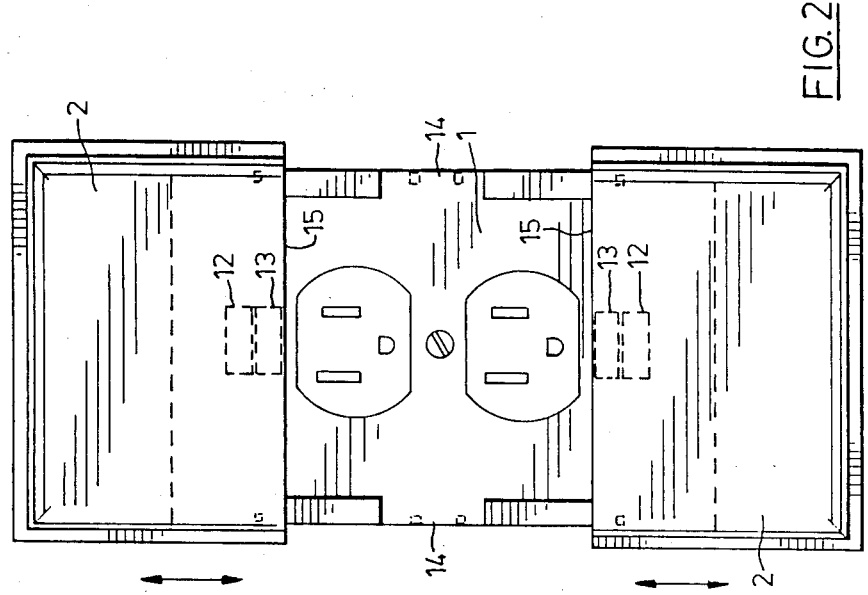
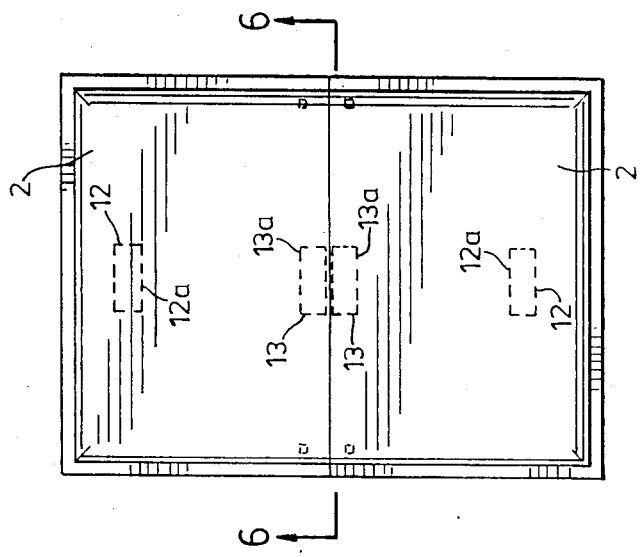
FIG. 2
FIG. 1

COVER PLATE FOR ELECTRICAL RECEPTACLES

This invention relates to protective devices for indoor electrical outlets. Such outlets are generally vertically mounted on walls within 0.5 meters (1.5 ft) of the floor level. At this height the electrical outlet is accessible to curious infants and young children. Children attempt to insert fingers, or while playing with metallic objects such as spoons, or keys, are tempted to insert such objects into the electrically charged openings of electrical outlets.

Conventional protective devices comprise a plastic plate, which covers one receptacle of a typically dual receptacle electrical outlet, the plastic plate having projecting from the inner face two or three prongs which engage the openings of the receptacle. The outer edges of such plastic plates are often tapered or rounded making them difficult to grasp and remove by children. Such protective devices require removal before insertion of an electrical plug, and replacement afterwards. This is particularly disadvantageous when an electrical outlet is used to power appliances such as vacuum cleaners, or drills which are frequently moved amongst several outlets. In addition, these protective devices are often lost since they are not permanently attached to the outlet.

Protective features of outdoor electrical outlet covers generally comprise a base plate, and one or two hinged cover plates. Weatherproof gaskets between the cover plates and base plate prevent water infiltration and resultant short circuit of the outlet. Outdoor outlet covers of this type could conceivably be used indoors to protect children from shock, however, they are relatively expensive due to their weatherproof design, the spring-loaded hinge cover plates are not particularly difficult for young children to tamper with, and such covers are not aesthetically compatible with most interior decor.

Various other types of safety covers for electrical outlets have been devised but have apparently not met with widespread commercial success, such as the detachable outer cover plates disclosed in U.S. Pat. No. 4,586,765 to Ban and U.S. Pat. No. 4,531,794 to Heverly. These detachable outer cover plates protrude from the wall surface exposing them to damage and are subject to damage or loss due to repeated removal and replacement.

The present invention comprises a base plate with openings to facilitate a typical dual receptacle electrical outlet. The base plate has parallel flanges on opposing edges which engage longitudinal slots of preferably two cover plates. The cover plates can slide relative to the base plate, alternately covering and exposing the receptacles. Means are provided to limit the travel of the cover plates and to reversibly lock them in a covered position on the base plate.

The locking means are resilient and may be released by simultaneously depressing the two corners of a cover plate above the locking means. Since the width of a cover plate is approximately 70 mm (2 ¾ inches) an adult can easily release the locking means with on hand while a young child, having a smaller hand, cannot. The coordination, dexterity, manual strength and mental concentration required to simultaneously depress both corners while also sliding the cover plate are usually beyond the physical capabilities and attention span of infants and young children.

In order that the invention may be readily understood, a preferred embodiment of the invention is described below with reference to the accompanying drawings in which:

FIG. 1 is an elevation view of the outer surface of the invention, as attached to a wall mounted electrical outlet, in a covered position.

FIG. 2 is an elevation view of the invention in an exposed position.

Figure 3:
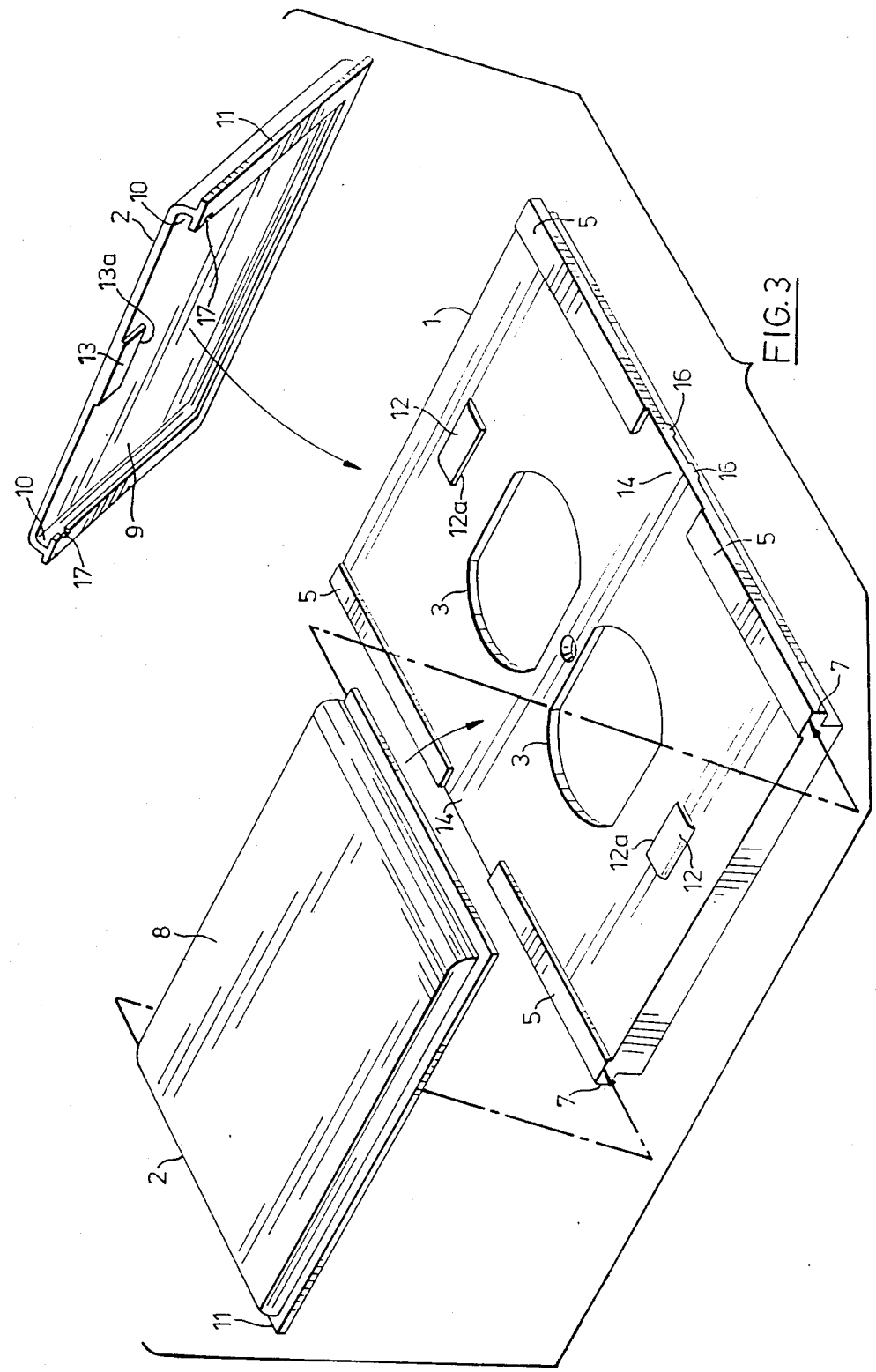
FIG. 3 is a three dimensional exploded view of the outer surface of the base plate and inner and outer surfaces of the cover plates.

Referring to FIG. 3, the cover for an electrical outlet comprises a base plate 1 and preferably two cover plates 2. Openings 3 in the base plate are shaped to accommodate and allow access to a standard two receptacle outlet. The base plate top surface 4 has rails 5 extending from it adjacent two opposing edges of the base plate 1.

Figures 4, 5, 6:
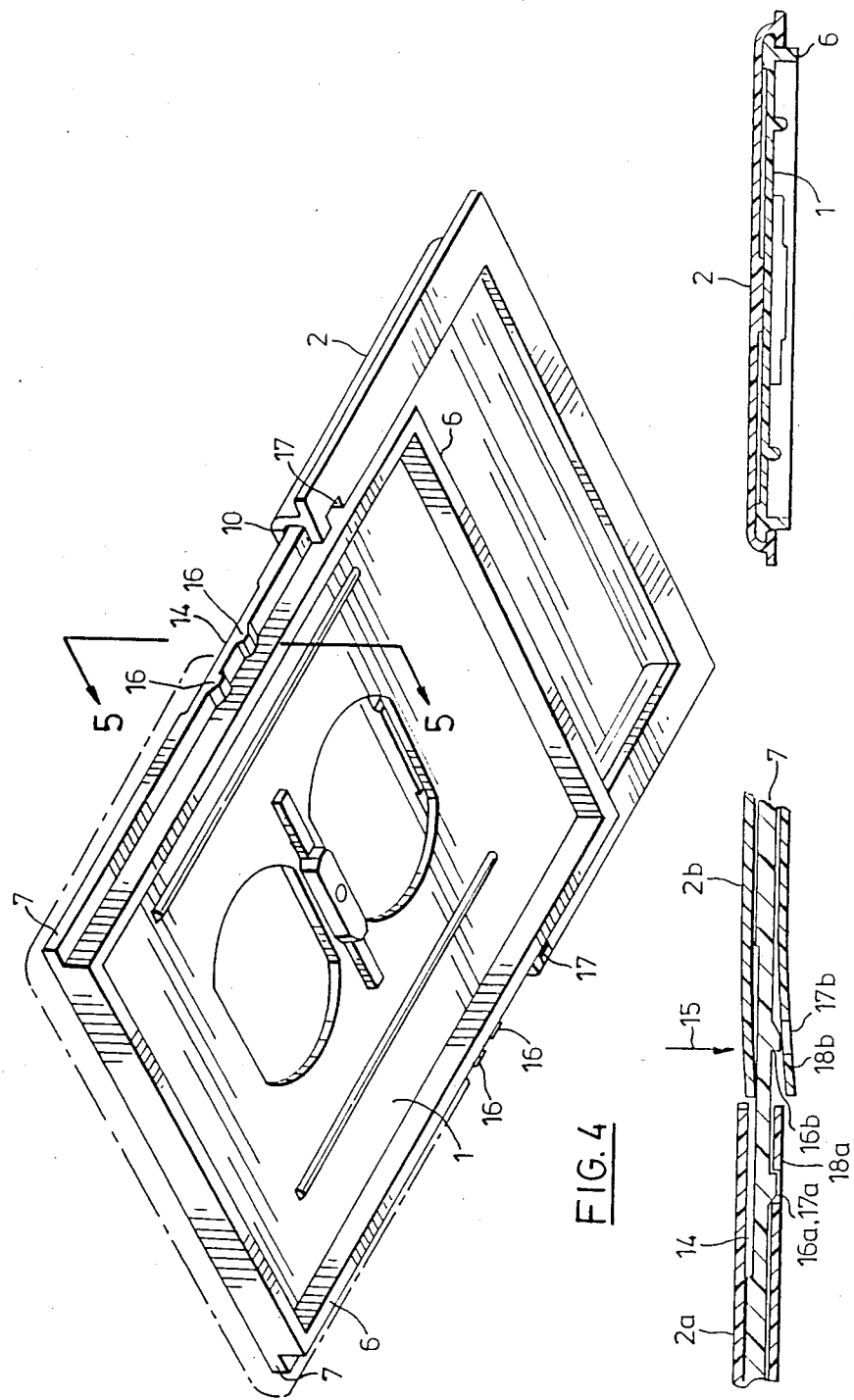
FIG. 4 is a three dimensional view of the inner surface of the base plate having one cover plate in the exposed position and the dotted outline of another cover plate in the covered position.
FIG. 5 is a sectional view of the resilient locking means along line 5—5 of FIG. 4.
FIG. 6 is a transverse sectional view of the invention along line 6—6 of FIG. 1.

Referring to FIG. 4, the base plate bottom surface has a peripheral wall 6 extending from it. The rails 5 and the peripheral wall 6 define a flange 7 along each edge of the base plate 1 adjacent the rails 5.

The peripheral wall 6 separates the flange 7 from the wall upon which the outlet and cover are mounted by a distance determined by the height of the peripheral wall 6, enabling free movement of the cover plates 2 as they slide relative to the base plate 1.

Referring to FIG. 3, the cover plates 2 have a top surface 8, a bottom surface 9 and inwardly opening longitudinal slots 10 formed at opposing edges beneath the bottom surface 9. In the particular embodiment shown, cover plates 2 have a peripheral outer protruding bottom rim 11 with the bottom surface 9 defining the slots 10 and which provides structural rigidity about the periphery of the cover plate 1.

Referring to FIGS. 3 and 4, the slots 10 of cover plates 2 coact with the flanges 7 of the base plate 1, and the bottom surfaces 9 of cover plates 2 coact with the rails 5 of base plate 1 to permit the cover plates 2 to slide smoothly relative to the base plate 1 between the exposed position shown in FIG. 2, and the covered position shown in FIG. 1.

In order to limit the travel of the cover plates 2 relative to the base plate 1, stop means are provided. Referring to FIG. 3, lower abutments 12 project from the base plate top surface 4 and an upper abutment 13 projects from each cover plate bottom surface 9. The abutments 12 and 13 have transverse edges 12a and 13a which engage one another when the cover plates 2 are in the exposed position shown in FIG. 2. The lower abutment 12 preferably has a varying thickness which is greatest at the abutting edge and tapers downwardly toward the plate surface 4. The wedge shape of the lower abutment 12 allows the upper abutment 13 to ride over lower abutment 12 when the cover plate 2 is assembled to the base plate 1. The cover plate 2 flexes upwardly as it slides over the base plate 1 allowing the upper abutment 13 to ride over the lower abutment 12 during assembly.

In the particular embodiment shown in the drawings, the cover for an electrical outlet has two cover plates 2 symmetrically disposed about the centre of the base plate 1. Both cover plates 2 can slide independently in opposing directions to cover or expose either receptacle of the outlet. It should be appreciated that a single cover plate covering both receptacles in the covered position is also within the ambit of this invention.

Referring to FIGS. 3 and 4, the cover for an electrical outlet includes resilient means for reversibly locking the cover plates 2 in the covered position shown in FIG. 1. The resilient locking means comprises wedge shaped locking tabs 16 projecting downwardly from the bottom surface of flanges 7 beneath a gap 14 between the rails 5 at either longitudinal edge of the base plate 1. Indentations 17 are provided in the rim 11 which coact with the tabs 16 to lock the cover plates 2 in the covered position.

Referring to FIG. 5, the cover plate 2a is shown in the covered and locked position having the indentation 17a engaging the locking tab 16a. By applying an inwardly directed force in the direction of the arrow 15 shown in FIG. 5, the indentations 17b and locking tabs 16b are disengaged. The cover plate 2b flexes under the downward force into the gap 14. While applying this force the cover plate 2b can slide to a position exposing the access openings 3 and outlet receptacle. As the cover plate slides from an exposed position to a covered position the leading rim portions 18a and 18b ride over the rearwardly tapered surfaces of the locking tabs 16a 16b. When the locking tab 16b and indentation 17b are in alignment, as shown in FIG. 5, the cover plate 2b flexes back to its original shape, engaging locking tab 16 and indentation 17 in the covered and locking position.

In operation, therefore, starting from the covered and locked position shown in FIG. 1, a force is applied simultaneously to the cover plate top surface 8 above the gaps 14. The cover plate 2 flexes inwardly into the gaps 14, the indentations 17 and the locking tabs 16 are disengaged, the cover plate 2, is unlocked and slides under force to the exposed position shown in FIG. 2 with the abutments 12 and 13 engaged.

To move from the exposed position the covered position, the cover plate 2 slides under until the leading rim portions 18 touch the rearward tapered surfaces of the locking tabs 16. Under continuing force the leading rim portions 18 ride over the locking tabs 16, flexing the cover plate 2 into the gaps 14 When the locking tabs 16 and the indentations 17 are aligned the cover plate 2 flexed back to its original shape so that the locking tabs 16 and the indentations 17 engage.

I claim:

1. A cover for an electrical outlet, comprising:
    a base plate having a top surface and bottom surface, and defining openings therethrough shaped to allow access to the outlet, said base plate having rails extending from the top surface adjacent two opposing edges of the plate and having a peripheral wall extending from the bottom surface defining a flange along each edge of the base plates having a rail;
    a cover plate having a top surface, a bottom surface and inwardly opening longitudinal slots defined at opposing edges between the bottom surface and a peripheral bottom rim, said slots coacting with the flanges of the base plate and the bottom surface of the cover plate coacting with the rails of the base plate to permit the cover plate to slide relative to the base plate;
    stop means on the top surface of the base plate and bottom surface of the cover plate which coact to limit the travel of the cover plate on the base plate; and
    locking means for the cover plate, said locking means comprising a locking tab projecting downwardly from the bottom surface of each flange beneath a gap defined in each rail, and an indentation defined in each bottom rim positioned beneath each rail, so that said locking tabs and indentations engage when the cover plate is in position covering the outlet access openings.

2. A cover for an electrical outlet according to claim 1, wherein said stop means comprises:
    an upper abutment projecting downwardly from the bottom surface of said cover plate;
    a lower abutment projecting upwardly from the top surface of said base plate;
    whereby the upper and lower abutments engage when the cover plate slides to a position exposing the outlet access openings.

3. A cover for an electrical outlet according to claim 1, wherein said cover plate comprises a first and second portion positioned symmetrically about the centre of the base plate, said first and second portions being slidable in opposite directions.

4. A cover as claimed in claim 1, where the rails for the base plate define a gap centrally along each longitudinal edge.

5. A cover as claimed in claim 1, wherein the peripheral bottom rim extends laterally of downward depending opposite sides of the cover plate.

6. A cover as claimed in claim 1, wherein the cover plate comprises a first and second portion, each sized to cover one of two access openings in the base plate, said base plate having a set of two spaced locking tabs each tab projecting downwardly from a central region of each longitudinal flange, each set of two tabs being positioned beneath a gap defined in each rail, and each cover plate having an indentation near the end of each bottom rim, each indentation being positioned to engage a locking tab when said cover plate is slid to cover an access opening.

7. A cover for an electrical outlet, comprising:
    a base plate having a top surface and a bottom surface, and defining openings therethrough shaped to allow access to the outlet, said base plate having rails extending from the top surface adjacent two opposing edges of the plate and having a peripheral wall extending from the bottom surface defining a flange along each edge of the base plates having a rail, said rails defining a gap centrally along each longitudinal edge;
    a cover plate having a top surface, a bottom surface and inwardly opening longitudinal slots defined at opposing edges between the bottom surface and a peripheral bottom rim, said slots coacting with the flanges of the base plate and the bottom surface of the cover plate coacting with the rails of the base plate to permit the cover plate to slide relative to the base plate; and
    stop means on the top surface of the base plate and bottom surface of the cover plate which coact to limit the travel of the cover plate on the base plate.

8. A cover for an electrical outlet according to claim 7, wherein said stop means comprises:

an upper abutment projecting downwardly from the bottom surface of said cover plate;

a lower abutment projecting upwardly from the top surface of said base plate;

whereby the upper and lower abutments engage when the cover plate slides to a position exposing the outlet access openings.

9. A cover for an electrical outlet according to claim 7, wherein said cover plate comprises a first and second portion positioned symmetrically about the centre of the base plate, said first and second portions being slidable in opposite directions.

10. A cover for an electrical outlet according to claim 7, further comprising locking means for the cover plate, comprising:

a locking tab projecting downwardly from the bottom surface of each flange between a gap defined in each rail; and an indentation defined in each bottom rim positioned between each rail, so that said locking tabs and indentations engage when the cover plate is in position covering the outlet access openings.

11. A cover as claimed in claim 10, wherein the cover plate comprises a first and second portion, each sized to cover one of two access openings in the base plate, said base plate having a set of two spaced locking tabs, each tab projecting downwardly from a central region of each longitudinal flange, each set of two tabs being positioned beneath a gap defined in each rail, and each cover plate having an indentation near the ned of each bottom rim, each indentation being positioned to engage a locking tab when said cover plate is slid to cover an access opening.

12. A cover as claimed in claim 7 wherein the peripheral bottom rim extends laterally of downward depending opposite sides of the cover plate.

13. A cover for an electrical outlet, comprising:

a base plate having a top surface and a bottom surface, and defining openings therethrough shaped to allow access to the outlet, said base plate having rails extending from the top surface adjacent two opposing edges of the plate and having a peripheral wall extending from the bottom surface defining a flange along each edge of the base plates having a rail;

a cover plate having a top surface, a bottom surface and inwardly opening longitudinal slots defined at opposing edges between the bottom surface and a peripheral bottom rim, said slots coacting with the flanges of the base plate and bottom surface of the cover plate coacting with the rails of the base plate to permit the cover plate to slide relative to the base plate, the cover plate having a first and second portion, each sized to cover one of two access openings in the base plate, said base plate having a set of two spaced locking tabs, each tab projecting downwardly from a central region of each longitudinal flange, each set of two tabs being positioned beneath a gap defined in each rail, and each cover plate having an indentation near the end of each bottom rim, each indentation being positioned to engage a locking tab when said cover plate is slid to cover an access opening;

stop means on the top surface of the base plate and bottom surface of the cover plate which coact to limit the travel of the cover plate on the base plate; and locking means for the cover plate, said locking means comprising a locking tab projecting downwardly from the bottom surface of each flange beneath a gap defined in each rail, and an indentation defined in each bottom rim positioned beneath each rail, so that said locking tabs and indentations engage when the cover plate is in position covering the outlet access openings.

14. A cover for an electrical outlet according to claim 13, wherein said stop means comprises:

an upper abutment projecting downwardly from the bottom surface of said cover plate;

a lower abutment projecting upwardly from the top surface of said base plate;

whereby the upper and lower abutments engage when the cover plate slides to a position exposing the outlet access openings.

15. A cover for an electrical outlet according to claim 13, wherein said cover plate comprises a first and second portion positioned symmetrically about the centre of the base plate, said first and second portions being slidable in opposite directions.

16. A cover as claimed in claim 13, wherein the rails for the base plate define a gap centrally along each longitudinal edge.

17. A cover as claimed in claim 13, wherein the peripheral bottom rim extends laterally of downward depending opposite sides of the cover plate.

* * * * *